US012728729B2

(12) United States Patent
Theodosakis et al.

(10) Patent No.: US 12,728,729 B2
(45) Date of Patent: Sep. 8, 2026

(54) LIMITING SPEED BASED ON STATE OF CHARGE

(71) Applicant: Textron Innovations Inc., Providence, RI (US)

(72) Inventors: Gregory August Theodosakis, Martinez, GA (US); Russell William King, Evans, GA (US); Jonathan Daniel Bowen, North Augusta, SC (US)

(73) Assignee: TEXTRON INNOVATIONS, INC, Providence, RI (US)

( * ) Notice: Subject to any disclaimer, the term of this patent is extended or adjusted under 35 U.S.C. 154(b) by 185 days.

(21) Appl. No.: 18/233,555

(22) Filed: Aug. 14, 2023

(65) Prior Publication Data

US 2025/0058643 A1 Feb. 20, 2025

(51) Int. Cl.

| | |
|---|---|
| ***B60L 15/10*** | (2006.01) |
| ***B60L 7/14*** | (2006.01) |
| ***B60L 50/60*** | (2019.01) |
| ***B60L 58/12*** | (2019.01) |
| ***G01C 9/08*** | (2006.01) |

(52) U.S. Cl.

CPC ................. *B60L 15/10* (2013.01); *B60L 7/14* (2013.01); *B60L 50/60* (2019.02); *B60L 58/12* (2019.02); *B60L 2200/22* (2013.01); *B60L 2240/12* (2013.01); *B60L 2240/16* (2013.01); *G01C 9/08* (2013.01)

(58) Field of Classification Search

CPC ...... B60L 15/10; B60L 58/12; B60L 2200/22; B60L 2240/12; B60L 2240/642

See application file for complete search history.

(56) References Cited

U.S. PATENT DOCUMENTS

| | | | |
|---|---|---|---|
| 4,166,514 | A | 9/1979 | de Freminville et al. |
| 4,434,469 | A | 2/1984 | Suzuki et al. |
| 5,064,015 | A | 11/1991 | Yamamoto et al. |
| 6,859,716 | B2 | 2/2005 | Kikuchi |
| 6,901,325 | B2 | 5/2005 | Kustosch et al. |

(Continued)

FOREIGN PATENT DOCUMENTS

| | | | | |
|---|---|---|---|---|
| EP | 2433831 A2 * | 3/2012 | .............. | B60L 50/66 |
| JP | 2008054441 A * | 3/2008 | .......... | B60L 11/1861 |

(Continued)

OTHER PUBLICATIONS

JP2008054441A_Machine_Translation (Year: 2008).*

(Continued)

*Primary Examiner* — Scott A Browne
*Assistant Examiner* — Jisun Choi
(74) *Attorney, Agent, or Firm* — BainwoodHuang

(57) ABSTRACT

Techniques to control a utility vehicle involve initially setting a maximum speed constraint imposed on the utility vehicle to an initial value. Such techniques further involve receiving a state of charge signal that indicates a current state of charge of a lithium battery which provides electric power for utility vehicle propulsion. Such techniques further involve, based on the state of charge signal that indicates the current state of charge of the lithium battery, adjusting the maximum speed constraint imposed on the utility vehicle from the initial value to an adjusted value that is different from the initial value.

14 Claims, 6 Drawing Sheets

(56) References Cited

U.S. PATENT DOCUMENTS 6,975,931 B2 12/2005 Adachi
7,025,157 B2 4/2006 Lindsay et al.
7,165,820 B2 1/2007 Rudd, III
7,228,943 B2 6/2007 Kugiya et al.
7,268,514 B2 9/2007 DeLange et al.
7,353,099 B2 4/2008 Lindsay et al.
7,362,065 B2 4/2008 Takano
7,410,447 B2 8/2008 Jamzadeh
7,698,044 B2 4/2010 Prakash et al.
7,896,315 B2 3/2011 Faust
7,942,228 B2 5/2011 Fenker et al.
8,033,955 B2 10/2011 Farnsworth
8,150,571 B2 4/2012 Takano
8,251,463 B2 8/2012 Worrel
8,316,822 B2 11/2012 Gray
8,396,638 B2 3/2013 Ishida et al.
8,396,640 B2 3/2013 Yuzawa et al.
8,494,737 B2 7/2013 Maier et al.
8,527,125 B2 9/2013 Tate et al.
8,538,620 B2 9/2013 Nakamura et al.
8,639,421 B2 1/2014 Harnisch et al.
8,692,499 B2 4/2014 Kim
8,818,677 B2 8/2014 Inoue et al.
8,880,303 B2 11/2014 Ishikawa et al.
9,053,635 B2 6/2015 Park
9,067,500 B2 6/2015 Penev
9,174,535 B2 11/2015 Um et al.
9,296,392 B2 3/2016 Hartmann et al.
9,376,108 B2 6/2016 Fairgrieve et al.
9,701,308 B2 7/2017 Fairgrieve et al.
9,701,309 B2 7/2017 Fairgrieve et al.
9,743,894 B2 8/2017 Okuno
9,827,955 B2 11/2017 Miller et al.
9,908,529 B2 3/2018 Nakade
10,124,987 B2 11/2018 Shibata et al.
10,272,926 B2 4/2019 Yamashita et al.
10,363,930 B2 7/2019 Fairgrieve et al.
10,449,863 B2 10/2019 Tomita et al.
10,532,726 B2 1/2020 Das
10,597,032 B2 3/2020 Kelly et al.
10,604,153 B2 3/2020 Inoguchi et al.
11,273,811 B2 3/2022 Books et al.
2003/0028310 A1* 2/2003 Schmitz ................. B60K 31/04
701/93
2019/0093573 A1* 3/2019 Kolhouse .............. F02D 11/105
2021/0001846 A1 1/2021 Yasui
2021/0046931 A1 2/2021 Kubotani
2021/0276426 A1* 9/2021 Cote ......................... B60L 7/18
2023/0030590 A1 2/2023 Seynaeve et al.
2023/0260293 A1* 8/2023 Goto .................... G06V 20/588
382/104
2023/0382240 A1* 11/2023 Yamaya .............. B60L 15/2018

FOREIGN PATENT DOCUMENTS

JP 2012249365 A * 12/2012
JP 2015182620 A * 10/2015
KR 20140085137 A * 7/2014

OTHER PUBLICATIONS

JP2012249365A_Machine_Translation (Year: 2012).*
KR20140085137A_Machine_Translation (Year: 2014).*
Machine Translation of EP 2433831 A2 (Year: 2012).*
Machine translation of JP2015182620A (Year: 2015).*

* cited by examiner

LIMITING SPEED BASED ON STATE OF CHARGE

BACKGROUND

A conventional electric golf cart includes a rechargeable battery and an electric motor connected to the golf cart's drive wheels through the drivetrain. To drive the electric motor and thus move the golf cart, a golf cart operator depresses an accelerator pedal. Similarly, to slow the electric motor and provide braking to the golf cart, the golf cart operator may depress a brake pedal.

Some conventional electric golf carts perform regenerative braking when slowing (e.g., in response to brake pedal depression, in response to letting up on the accelerator pedal, etc.). In regenerative braking, the drive wheels of the golf cart turn the electric motor to convert kinetic energy of the moving golf cart into electrical energy which is stored back into the rechargeable battery for future use.

SUMMARY

Some conventional electric golf carts attempt to prevent driving over a pre-set maximum golf cart speed. Accordingly, if the operator of such a golf cart fully depresses the accelerator pedal, the electric motor of the golf cart may move the golf cart forward but no faster than the pre-set maximum golf cart speed. For example, a golf course that manages a fleet of golf carts may pre-set the maximum golf cart speed of its golf cart fleet to 15 miles per hour (mph).

Some conventional electric golf carts may use regenerative braking to prevent the golf carts from exceeding the pre-set maximum golf cart speed. Along these lines, suppose that the operator of a golf cart depresses the accelerator pedal while driving the golf cart down a hill. In such a situation, the electric motor of the golf cart may perform regenerative braking (i.e., convert kinetic energy of the moving golf cart into electrical energy for storage back into the rechargeable battery) to prevent the golf cart from exceeding the pre-set maximum golf cart speed.

However, suppose that the rechargeable battery is already at a high state of charge and the hill is relatively steep such that regenerative braking would provide more electrical energy than the rechargeable battery can accept. In such a situation, such electrical energy from regenerative braking should not be provided back to the rechargeable battery.

One conventional approach to lessening the amount of regenerative braking electrical energy provided back to a rechargeable battery that is already at a high state of charge is to use a burn-off resistor system so that the rechargeable battery only receives electrical energy it can accept. However, routine use of the burn-off resistor system may lead to or create other challenges such as heat dissipation issues (e.g., overheating, system shut downs, etc.).

Another conventional approach to lessening the amount of regenerative braking electrical energy provided back to a rechargeable battery that is already at a high state of charge is to pre-set the maximum golf cart speed of a golf cart to a relatively low maximum golf cart speed. For example, the golf course that manages the golf cart fleet may pre-set the maximum golf cart speed of its fleet to 12 mph rather than 15 mph. However, such a lower pre-set maximum golf cart speed results in a persistent reduction of a golf cart's top speed even in circumstances in which the reduction is not necessary (e.g., when the golf cart is driving on level ground, when the rechargeable battery has a low state of charge, etc.).

Nevertheless, it is important to prevent a rechargeable battery which is already at a high state of charge from encountering an overvoltage situation. To avoid putting a rechargeable battery into an overvoltage situation, battery protection circuitry may even entirely disconnect the rechargeable battery from the electric motor of the golf cart thus preventing excessive regenerative braking electrical energy from being provided back to the rechargeable battery. Unfortunately, if the driver is driving the golf cart down a steep hill and the battery protection circuitry disconnects the rechargeable battery due to regenerative braking causing an overvoltage situation, the emergency brake may automatically engage bringing the golf cart to a sudden stop.

Advantageously, improved techniques are directed to controlling a utility vehicle via limiting speed based on state of charge. Along these lines, the utility vehicle may use stored electrical energy from a rechargeable battery for utility vehicle propulsion and may further perform regenerative braking to return electrical energy back to the rechargeable battery. If the rechargeable battery is at a low state of charge, the utility vehicle may operate under a first maximum speed constraint. However, the utility vehicle may operate under a second maximum speed constraint that is different from the first maximum speed constraint when the rechargeable battery is at a high state of charge. For example, the utility vehicle may automatically lower its maximum permitted speed when the state of charge is sufficiently high. Such automatic lowering of the maximum permitted speed prevents regenerative braking from creating an overvoltage situation. On the other hand, the maximum permitted speed of the utility vehicle is not persistently reduced, but instead reduced only in certain situations such as to prevent the overvoltage situation, thus enabling the utility vehicle to operate under a higher maximum permitted speed at other times.

One embodiment is directed to a method of controlling a utility vehicle. The method includes initially setting a maximum speed constraint imposed on the utility vehicle to an initial value. The method further includes receiving a state of charge signal that indicates a current state of charge of a lithium battery which provides electric power for utility vehicle propulsion. The method further includes, based on the state of charge signal that indicates the current state of charge of the lithium battery, adjusting the maximum speed constraint imposed on the utility vehicle from the initial value to an adjusted value that is different from the initial value.

Another embodiment is directed to electronic circuitry to control a utility vehicle. The electronic circuitry includes a battery system interface, and a controller coupled with the battery system interface. The controller is constructed and arranged to perform a method of.

(A) initially setting a maximum speed constraint imposed on the utility vehicle to an initial value, (B) receiving, though the battery system interface, a state of charge signal that indicates a current state of charge of a lithium battery which provides electric power for utility vehicle propulsion, and (C) based on the state of charge signal that indicates the current state of charge of the lithium battery, adjusting the maximum speed constraint imposed on the utility vehicle from the initial value to an adjusted value that is different from the initial value.

Yet another embodiment is directed to a utility vehicle which includes:

(A) a battery management system (BMS) having a lithium battery, (B) a utility vehicle propulsion system constructed and arranged to provide utility vehicle propulsion using electric power from the lithium battery; and (C) electronic circuitry coupled with the BMS and the utility vehicle propulsion system.

The electronic circuitry is constructed and arranged to perform a method of:

(i) initially setting a maximum speed constraint imposed on the utility vehicle to an initial value, (ii) receiving, from the BMS, a state of charge signal that indicates a current state of charge of the lithium battery which provides electric power for utility vehicle propulsion, and (iii) based on the state of charge signal that indicates the current state of charge of the lithium battery, adjusting the maximum speed constraint imposed on the utility vehicle from the initial value to an adjusted value that is different from the initial value.

In some arrangements, the utility vehicle further includes a set of ground engagement members. Additionally, the utility vehicle propulsion system includes:

(i) an electric motor constructed and arranged to operate the set of ground engagement members, and (ii) a motor controller coupled with the electronic circuitry, the motor controller being constructed and arranged to control the electric motor.

The motor controller includes a set of inertial measurement units (IMUs). Additionally, adjusting the maximum speed constraint imposed on the utility vehicle includes performing an incline assessment operation that indicates whether the utility vehicle is currently traveling front-to-back down an incline. Such an operation may prevent the maximum speed constraint imposed on the utility vehicle from being lowered from the first speed limit to the second speed limit unless the utility vehicle is currently traveling front-to-back down the incline. A result of the incline assessment operation is based on input from the set of IMUs.

In some arrangements, the initial value is a first speed limit. Additionally, the adjusted value is a second speed limit that is slower than the first speed limit. Furthermore, adjusting the maximum speed constraint imposed on the utility vehicle includes lowering the maximum speed constraint imposed on the utility vehicle from the first speed limit to the second speed limit.

In some arrangements, adjusting the maximum speed constraint imposed on the utility vehicle further includes performing a comparison operation that compares the current state of charge of the lithium battery indicated by the state of charge signal to a predefined state of charge threshold for the lithium battery. A result of the comparison operation indicates that the current state of charge of the lithium battery exceeds the predefined state of charge threshold for the lithium battery. The maximum speed constraint for the utility vehicle is lowered from the first speed limit to the second speed limit in response to the result of the comparison operation indicating that the current state of charge of the lithium battery exceeds the predefined state of charge threshold for the lithium battery.

In some arrangements, adjusting the maximum speed constraint imposed on the utility vehicle further includes performing an incline assessment operation that indicates whether the utility vehicle is currently traveling down an incline to prevent the maximum speed constraint imposed on the utility vehicle from being lowered from the first speed limit to the second speed limit unless the utility vehicle is currently traveling down an incline.

In some arrangements, the utility vehicle includes an electric motor that provides utility vehicle propulsion. Additionally, performing the incline assessment operation includes providing an incline assessment operation result indicating that the utility vehicle is traveling front-to-back down an incline in response to the electric motor rotating in a predefined direction and regenerating an amount of energy that exceeds an energy regeneration threshold.

In some arrangements, the utility vehicle includes a set of inertial measurement units (IMUs). Additionally, performing the incline assessment operation includes providing an incline assessment operation result indicating that the utility vehicle is traveling front-to-back down an incline in response to a set of output signals from the set of IMUs.

In some arrangements, the utility vehicle includes an accelerator pedal and a motor controller coupled with the accelerator pedal. The motor controller initially maps angular deflection of the accelerator pedal to a first linear utility vehicle propulsion response from zero to the first speed limit. Additionally, lowering the maximum speed constraint imposed on the utility vehicle from the first speed limit to the second speed limit includes remapping the angular deflection of the accelerator pedal to a second linear utility vehicle propulsion response from zero to the second speed limit in place of the first linear utility vehicle propulsion response.

In some arrangements, a current speed of the utility vehicle is lower than the first speed limit and higher than the second speed limit. Additionally, the method further includes slowing the utility vehicle from the current speed to at least a rate of the second speed limit in response to lowering the maximum speed constraint imposed on the utility vehicle from the first speed limit to the second speed limit.

In some arrangements, the current speed of the utility vehicle is lower than the first speed limit and the second speed limit. Additionally, the method further includes maintaining the current speed of the utility vehicle below the second speed limit.

In some arrangements, the utility vehicle includes a battery management system (BMS) coupled with the lithium battery, and the state of charge signal that indicates the current state of charge of the lithium battery is received from the BMS. Additionally, the method further includes receiving a current voltage signal that indicates a current voltage of the lithium battery. The current voltage signal is different from the state of charge signal that indicates the current state of charge of the lithium battery.

Other embodiments are directed to systems, subsystems, apparatus, assemblies, and so on. Some embodiments are directed to various methods, componentry, platforms, crafts, etc. which are involved in speed limiting based on state of charge.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to controlling a vehicle via limiting speed based on a current state of charge of a rechargeable battery. Along these lines, the vehicle may use stored electrical energy from the rechargeable battery for vehicle propulsion and may further perform regenerative braking to return electrical energy back to the rechargeable battery. If the rechargeable battery is currently at a low state of charge, the vehicle may operate under a first maximum speed constraint. However, the vehicle may operate under a second maximum speed constraint that is different from the first maximum speed constraint when the rechargeable battery is currently at a high state of charge. For example, the vehicle may automatically lower its maximum permitted speed when the state of charge becomes sufficiently high. Accordingly, the maximum permitted speed of the vehicle is not persistently reduced, but instead reduced only in certain situations. Furthermore, the rechargeable battery and/or related circuitry is still effectively safeguarded against creating and/or encountering an overvoltage situation as well as the associated consequences.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
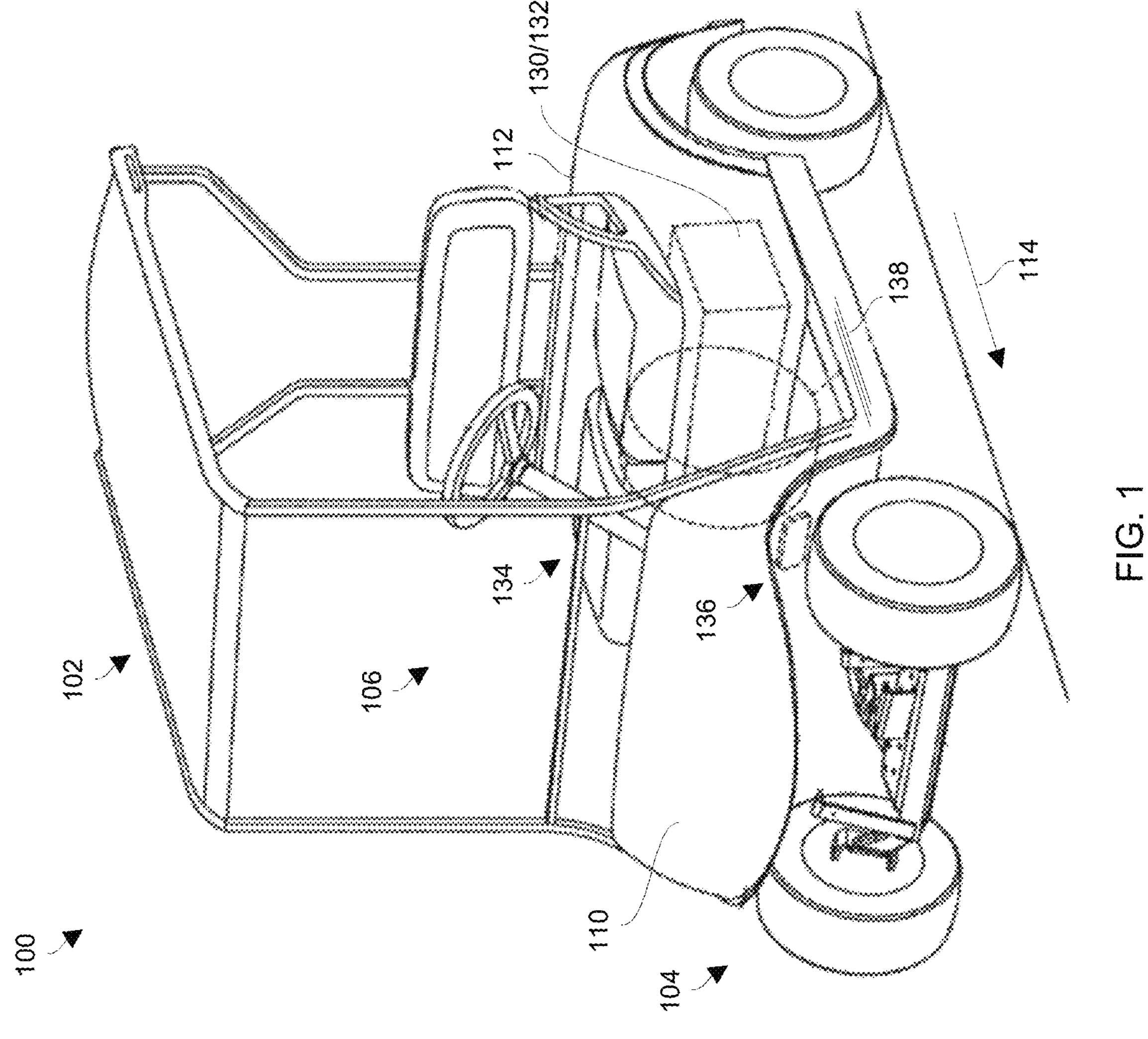
FIG. 1 is a diagram of an example vehicle which provides speed limiting based on state of charge in accordance with certain embodiments.

FIG. 1 is a diagram of an example utility vehicle 100 which limits speed based on state of charge in accordance with certain embodiments. The utility vehicle 100 includes a utility vehicle body 102 (e.g., a chassis, a frame, etc.), a set of engagement members 104 (e.g., a set of tires), and a motion control system 106. It should be understood that the utility vehicle 100 has the form factor of a golf car by way of example only and that other utility vehicle form factors are suitable for use as well such as those of personnel and/or cargo transport vehicles, food and beverage vehicles, hospitality vehicles, all-terrain vehicles (ATVs), utility task vehicles (UTVs), tracked vehicles, larger specialized equipment and/or application vehicles, motorcycles, scooters, as well as other lightweight and/or special purpose vehicles.

The utility vehicle body 102 defines a vehicle front 110 and a vehicle back 112. Accordingly, when the utility vehicle 100 moves forward, the utility vehicle 100 is considered to move in a front-to-back direction (see arrow 114).

The set of engagement members 104 is constructed and arranged to interact with the environment to move the utility vehicle 100. It should be understood that various types of engagement members 104 are suitable for use (e.g., tires/wheels, tracks, rails, combinations thereof, etc.) depending on the type of environment or terrain (e.g., a road, dirt, brush, snow, ice, marsh, etc.).

The motion control system 106 is constructed and arranged to control vehicle movement such as drive provided by the set of engagement members 104, speed control, braking, and so on thus enabling the utility vehicle 100 to effectively maneuver and perform useful work. The motion control system 106 may include, among other things, a motor system 130, a battery management system 132, and additional components 134 such as a set of user controls 136 (e.g., foot pedals, transmission control, a keyed switch, a maintenance switch, additional levers/knobs/etc.), cabling 138, and so on.

It should be understood that certain components of the motor control system 106 (or portions thereof) may be disposed within a set of compartments (in one or more compartments) under a set of seats (under one or more seats) of the utility vehicle 100. For example, a compartment underneath a seat of the utility vehicle 100 may house one or more rechargeable batteries, control circuitry, cabling, controls, etc. for ease of access/serviceability, to protect passengers, for protection against damage, for security, and so on. Other locations are suitable for use as well such as under a hood, under a rear bed, etc.

It should be further understood that the motion control system 106 includes other apparatus/components as well. Along these lines, the motion control system 106 further includes a drivetrain (e.g., a set of gears, linkage, differential, etc.) that connects the motor system 130 to the set of engagement members 104 (e.g., two drive wheels and two non-drive wheels), a steering wheel (or column), a steering gear set that connects the steering wheel to certain engagement members 104, a set of brakes, other controls and sensors, and so on.

As will be explained in further detail shortly, the utility vehicle 100 includes an electric traction motor which runs on electric power from a rechargeable battery for propulsion, and which is equipped with a regenerative braking control feature which recharges the rechargeable battery. Moreover, the utility vehicle 100 is configured to operate in accordance with a maximum speed constraint (e.g., to protect equipment of the utility vehicle 100, to protect passengers and/or bystanders, combinations thereof, etc.). Such a speed limit is the maximum vehicle speed permitted/allowed by the motion control system 106.

During operation, the utility vehicle 100 is configured to automatically select, in real-time, a particular maximum speed constraint based on the current state of charge of the rechargeable battery. Along these lines, if the rechargeable battery is at a low state of charge, the utility vehicle 100 may operate under a first maximum speed constraint (e.g., 20 mph). However, the utility vehicle 100 may automatically operate under a second maximum speed constraint (e.g., 12 mph) that is different from the first maximum speed constraint when the rechargeable battery is at a high state of charge. Such real-time speed limit adjusting enables the utility vehicle 100 to operate effectively in certain situations.

For example, when the rechargeable battery is at a low state of charge, the utility vehicle 100 may operate at a relatively high maximum speed constraint to enable the utility vehicle 100 to perform useful work in an optimal manner. Since the rechargeable battery is at a low state of charge, the rechargeable battery is able to receive high or heavy recharging from regenerative braking.

Additionally, such real-time speed limit adjusting enables the utility vehicle 100 to effectively operate while suitably safeguarding the rechargeable battery and/or other componentry in other situations. For example, when the rechargeable battery is at a high state of charge, the utility vehicle 100 may automatically impose a lower speed constraint to avoid creating an overvoltage situation, to alleviate having to use a burn-off resistor, to avoid reliance on a mechanical service brake or emergency brake, etc. Since the utility vehicle 100 operates under the lower maximum speed constraint due to the rechargeable battery being at a high state of charge, regenerative braking provides less electric charge back to the rechargeable battery thus avoiding an overvoltage situation. Further details will now be provided with reference to FIGS. 2 and 3.

Figure 2:
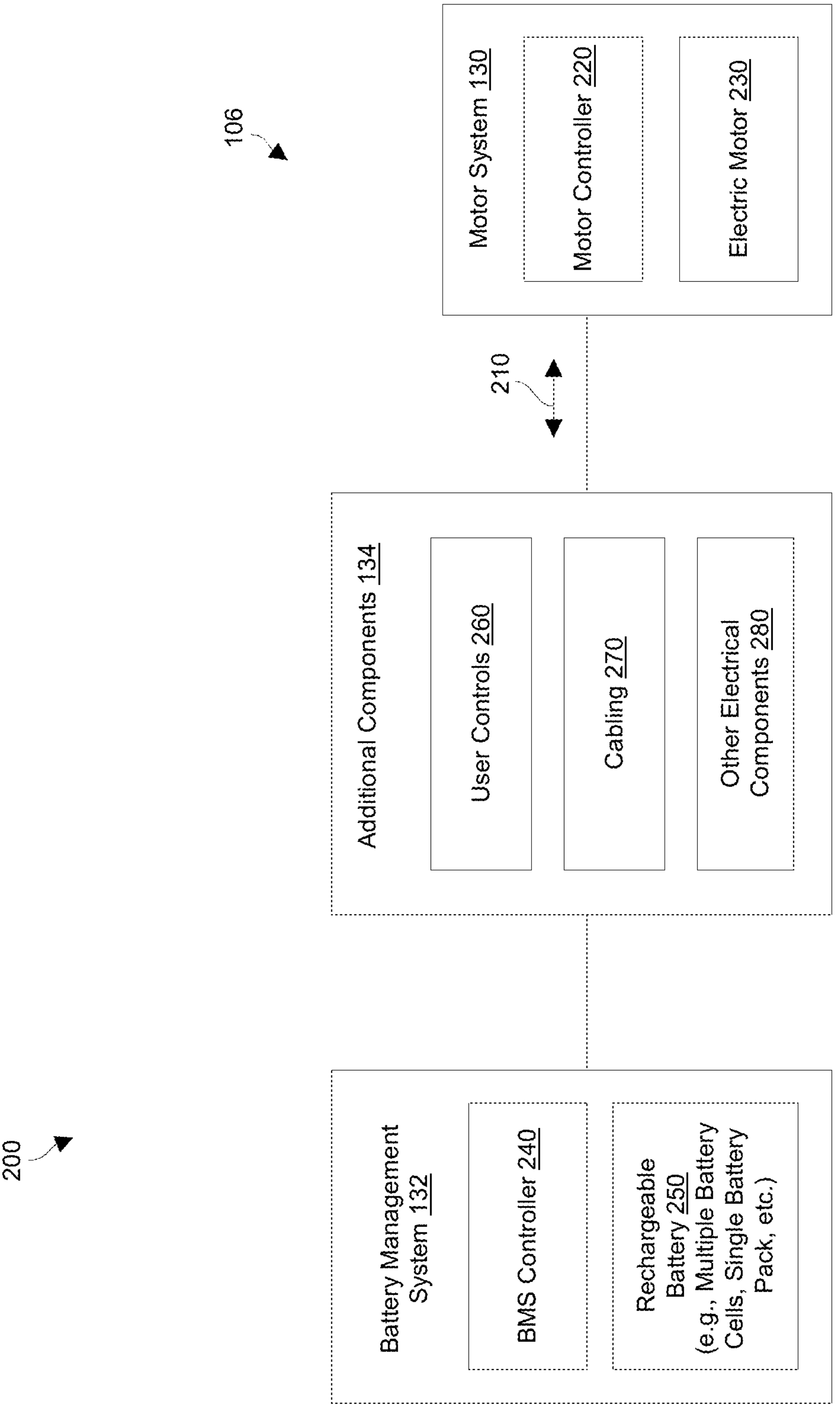
FIG. 2 is a block diagram of a portion of the example vehicle in accordance with certain embodiments.
Figure 3:
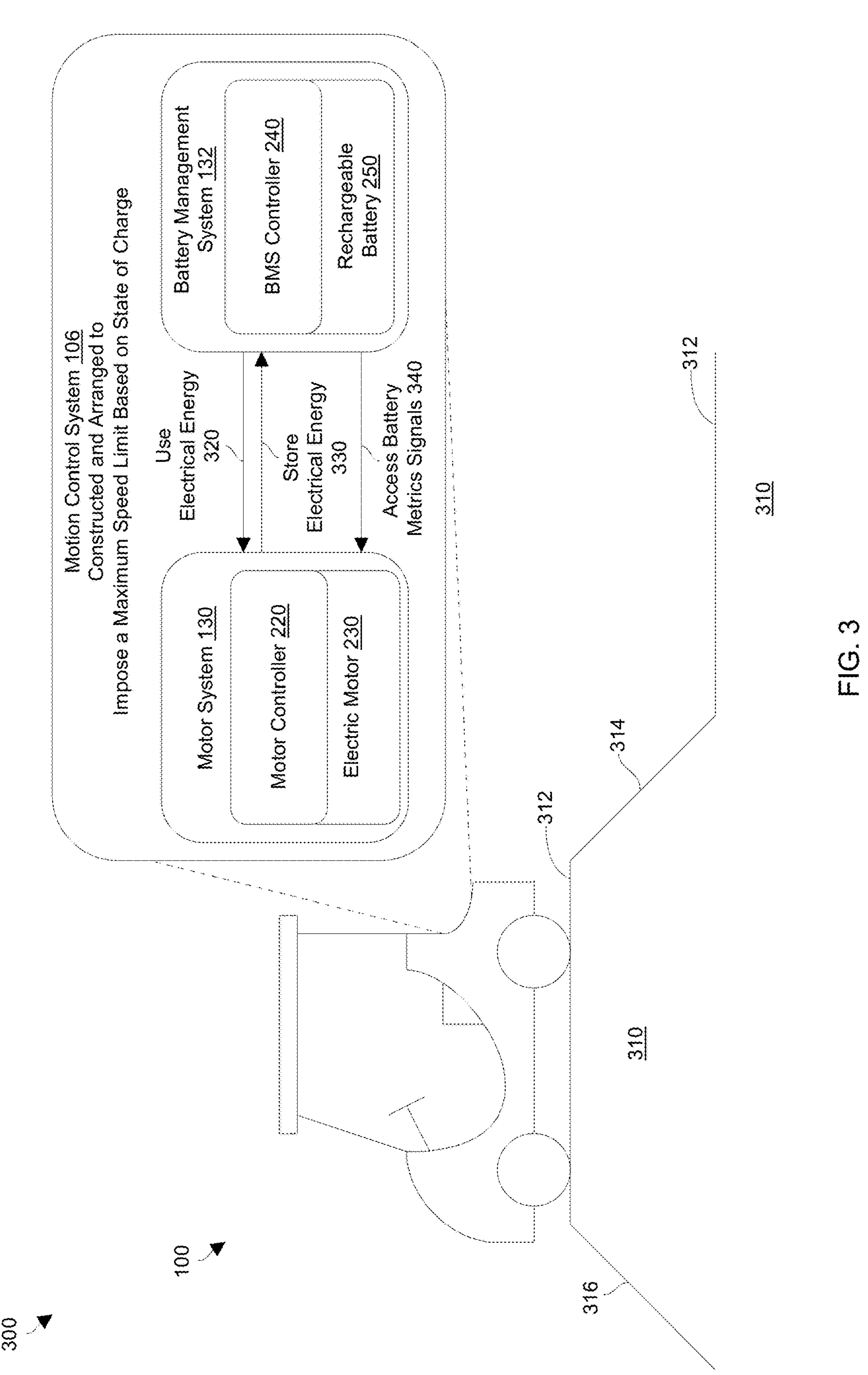
FIG. 3 is a diagram illustrating particular vehicle operations in accordance with certain embodiments.

FIGS. 2 and 3 provide certain details regarding speed limiting based on rechargeable battery state of charge in accordance with certain embodiments. FIG. 2 is a view 200 of at least a portion of the motion control system 106 of the utility vehicle 100 (also see FIG. 1) in accordance with certain embodiments. FIG. 3 is a view 300 illustrating certain operations that are performed by the motion control system 106 in accordance with certain embodiments.

As shown in the view 200 of FIG. 2, the motor system 130, the battery management system (BMS) 132, and the additional components 134 are coupled with each other (e.g., via power buses, communications buses, etc.) and exchange electrical signals 210 (e.g., power signals, control/status signals, sensor signals, and so on). The motor system 130 includes a motor controller 220 and an electric traction motor 230 (or simply electric motor 230) coupled with the motor controller 220. The BMS 132 includes a BMS controller 240 and a rechargeable battery 250 coupled with the BMS controller 240. The additional components 134 refer to various componentry coupled with the motor system 130 and/or the battery management system 132 such as user controls 260 (e.g., switches, pedals, etc.), cabling 270 (e.g., power cables, communications buses, etc.), and other electrical components 280 (e.g., a charging receptacle and/or an onboard charger, lights, a global positioning system (GPS), one or more inertial measurement units, specialized equipment, other loads, etc.). In some arrangements, various components of the motion control system 106 communicate through a controller area network (CAN) bus via electronic CAN messages in accordance with the CAN protocol.

The motor controller 220 of the motor system 130 is constructed and arranged to control delivery of stored electric energy from the BMS 132 to the electric motor 230 which ultimately operates at least some of the engagement members 124 to move the utility vehicle 100. Additionally, the motor controller 220 operates the electric motor 230 to provide regenerative braking in which the electric motor 230 converts kinetic energy of the moving utility vehicle 100 into electrical energy to recharge the rechargeable battery 250 (e.g., during braking, while the utility vehicle 20 coasts downhill, during accelerator pedal release, etc.). To this end, the motor controller 220 and/or the additional components 134 may be provisioned with a battery system interface that enables the motor controller 220 to robustly and reliably connect with and communicate with the BMS 132.

As will be explained in further detail shortly and in accordance with certain embodiments, the motor controller 220 is constructed and arranged to adjust a maximum speed constraint in real time based on a current state of charge of the rechargeable battery 250 of the battery management system 132. The motor controller 220 then imposes this maximum speed constraint on the utility vehicle 100 while the utility vehicle 100 is being driven. Accordingly, such speed limiting adjustment is made by the motor controller 220 automatically without requiring user intervention.

In accordance with certain embodiments, the electric motor 230 is a three-phase induction motor which includes a stator having three-phase windings, and a rotor connected to one or more engagement members 104 (also see FIG. 1). The motor controller 220 operates the electric motor 230 by providing a three-phase AC current through the stator to produce a rotating magnetic field which rotates the rotor either in the forward or reverse direction. The motor controller 220 controls the rate of rotation and strength by controlling the frequency and amplitude of the AC current.

The BMS controller 240 of the battery management system 132 is constructed and arranged to control electrical access to the rechargeable battery 250. Additionally, the BMS 50 may respond to various events such as sleep events (e.g., timeouts) to prevent excessive discharging of the rechargeable battery 250, overvoltage events to prevent creating an overvoltage situation, etc. thus safeguarding the rechargeable battery 250. The BMS controller 240 may respond to other events as well such as wakeup events (e.g., actuation of the user controls 136, etc.), charging events, faults, and so on to properly and safely control charging and discharging of the rechargeable battery 250.

It should be understood that a variety of battery types and form factors are suitable for the rechargeable battery 250. For example, the rechargeable battery 250 may be a lithium battery which includes multiple lithium battery cells, a single battery pack, combinations thereof, and so on. As another example, the rechargeable battery 250 may utilize one or more lead acid batteries in place of, or in combination with, the lithium battery, and so on. In some multi cell arrangements, the BMS controller 240 monitors various individual metrics from each cell (e.g., state of charge, voltage, temperature, etc.) and is constructed and arranged to provide such individual metrics and/or aggregated metrics (e.g., the highest voltage among the cells, the lowest voltage among the cells, the highest temperature among the cells, the lowest temperature among the cells, averaged and/or median values, etc.) to the motor system 130 (e.g., periodically, in response to commands, combinations thereof, etc.).

In accordance with some embodiments, the BMS controller 240 includes a BMS contactor and a BMS control circuit that closes the BMS contactor in order to connect the rechargeable battery 250 to the motor system 130. If the BMS control circuit detects certain events and/or faults, the BMS control circuit opens the BMS contactor to disconnect the rechargeable battery 250 from the motor system 130. For example, if there is too much regenerative braking charge supplied by the motor system 130 while the rechargeable battery 250 is almost fully charged, the BMS control circuit may open the BMS contactor to avoid an overvoltage situation. Such operation safeguards the rechargeable battery 250.

The user controls 260 of the additional components 134 are constructed and arranged to enable an operator to control operation of the utility vehicle 100 (FIG. 1). Along these lines, the user controls 260 may include an accelerator pedal to enable an operator to control the speed of the electric motor 230 and thus the speed of the utility vehicle 100. Additionally, the user controls 260 may include a brake pedal to enable the operator to provide braking (e.g., regenerative braking, deployment of a mechanical service brake if available, engagement of an emergency or parking brake if fully depressed, etc.). Furthermore, the user controls 260 may include a transmission switch to control whether the motor system 130 moves the utility vehicle 100 in the forward (or front-to-back) direction or reverse (or back-tofront) direction in response to pedal depression. Other user controls 260 include a keyed switch, a tow switch, and so on.

In some arrangements, speed control which is based on the amount of accelerator pedal deflection (or depression) involves Hall sensing and inductive throttles. However, other mechanisms are suitable for use as well such as measuring accelerator pedal deflection using a potentiometer or similar device, accessing a mapping table which maps (or converts) a signal from the potentiometer to particular speeds, etc.

During operation, the operator may use the utility vehicle 100 to perform useful work. For example, in the context of a golf cart, the operator may drive the utility vehicle 100 over terrain 310 while utility vehicle 100 carries one or more sets of golf clubs to maneuver among holes of a golf course. Such terrain 310 may include flat areas 312, uphill areas 314, downhill areas 316, and so on.

As mentioned earlier, other uses exist for the utility vehicle 100 (e.g., personnel and/or cargo transport, catering, emergency applications, off-road applications, specialized applications, etc.). For such other uses, the environment may be similar to or different from the terrain 310.

During such operation, there may be times when the electric motor 230 uses electric power from the rechargeable battery 250 (e.g., while the utility vehicle 100 drives uphill and/or on a flat area for an extended time). Such consumption of electrical energy is illustrated by the arrow 320 in FIG. 3.

Furthermore, there may be other times when the electric motor 230 performs regenerative braking to provide electrical energy back to the rechargeable battery 250 (e.g., while the utility vehicle 100 drives downhill). Such storage of electrical energy provided by the electric motor 230 back into the rechargeable battery 250 is illustrated by the arrow 330 in FIG. 3.

In accordance with certain embodiments, the motor controller 220 accesses battery metrics signals 340 from the BMS 132 and, based on the battery metrics signals 340, adjusts a maximum speed constraint based on a current state of charge of the rechargeable battery 250. Along these lines, the motor controller 220 imposes a first maximum speed limit when the rechargeable battery 250 currently has a relatively high state of charge. Additionally, the motor controller 220 imposes a second maximum speed limit that is lower than the first maximum speed limit when the rechargeable battery 250 currently has a relatively low state of charge.

Along these lines, percentage (%) may be used to gauge the state of charge of the rechargeable battery 250. For example, when the rechargeable battery 250 is at 0% state of charge, the rechargeable battery 250 may be considered completely empty. Similarly, when the rechargeable battery 250 is at 100% state of charge, the rechargeable battery 250 may be considered completely full.

Additionally, the motor controller 220 may be configured to operate the rechargeable battery 250 with a state of charge range that is healthy for the rechargeable battery 250 such as between 40% and 90% (other amount ranges are suitable for use as well). Such a range may be well suited for lithium ion batteries.

To maintain the state of charge of the rechargeable battery 250 within the healthy state of charge range, the motor controller 220 may shunt regenerative braking current through a burn-off resistor once the rechargeable battery 250 charges to 90% state of charge. Additionally, the motor controller 220 may prevent the electric motor 220 from further discharging the rechargeable battery 250 once the rechargeable battery 250 drops to 40% state of charge.

Furthermore, the motor controller 220 may consider any state of charge over a predefined threshold of X % as a high state of charge (e.g., 75%, 80%, 85%, etc.). Along these lines, the motor controller 220 may compare a current state of charge percentage received from the BMS 132 to the predefined threshold. If the current state of charge percentage is higher than the predefined threshold, the rechargeable battery 250 is considered to be at a high state of charge. However, if the current state of charge percentage is lower than the predefined threshold, the rechargeable battery 250 is considered to be at a low state of charge.

In some embodiments, the value of X is established such that, if the utility vehicle 100 performs regenerative braking while the current state of charge is above X, such electric charging from regenerative braking will not create an overvoltage situation. For example, regenerative braking by the utility vehicle 100 may provide heavy electrical charging while the utility vehicle 100 moves in the front-to-back direction down a steep hill at the current maximum speed limit. Here, X is established low enough so that the rechargeable battery 250 is able to accept such heavy electrical charging and avoid an overvoltage situation.

To ascertain the current state of charge of the rechargeable battery 250, the motor controller 220 receives the battery metrics signals 340 from the BMS 132. In addition to state of charge, such battery metrics signals 340 may identify other characteristics of the rechargeable battery 250 such as the current battery voltage, the current battery temperature, the amount of remaining capacity (or stored charge), and so on. Such battery metrics signals 340 may be periodically outputted by the BMS, read (or requested) from the BMS 132, combinations thereof, etc. Further details will now be provided with reference to FIGS. 4 and 5.

Figure 4:
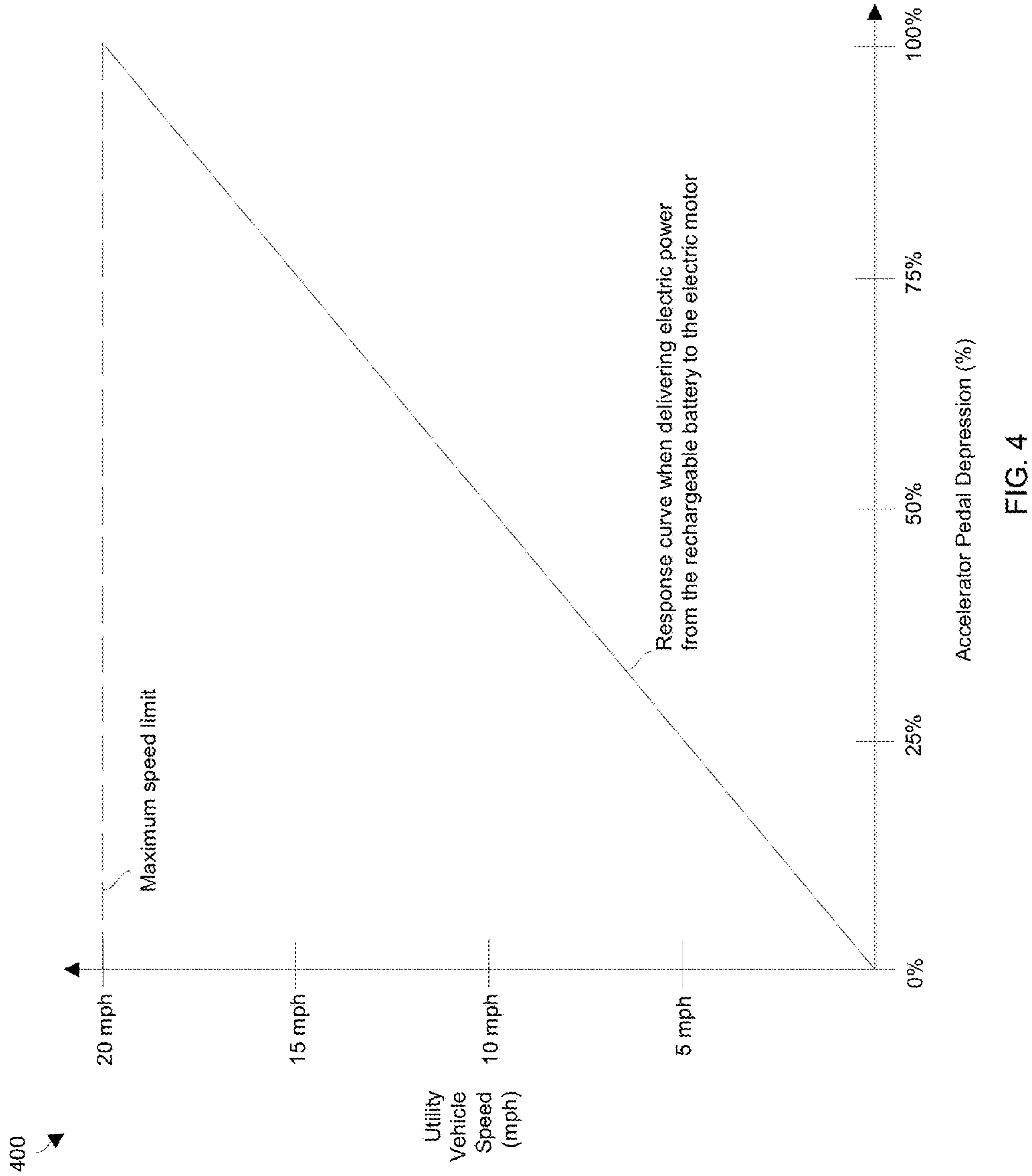
FIG. 4 is a chart of a first speed response function in accordance with certain embodiments.
Figure 5:
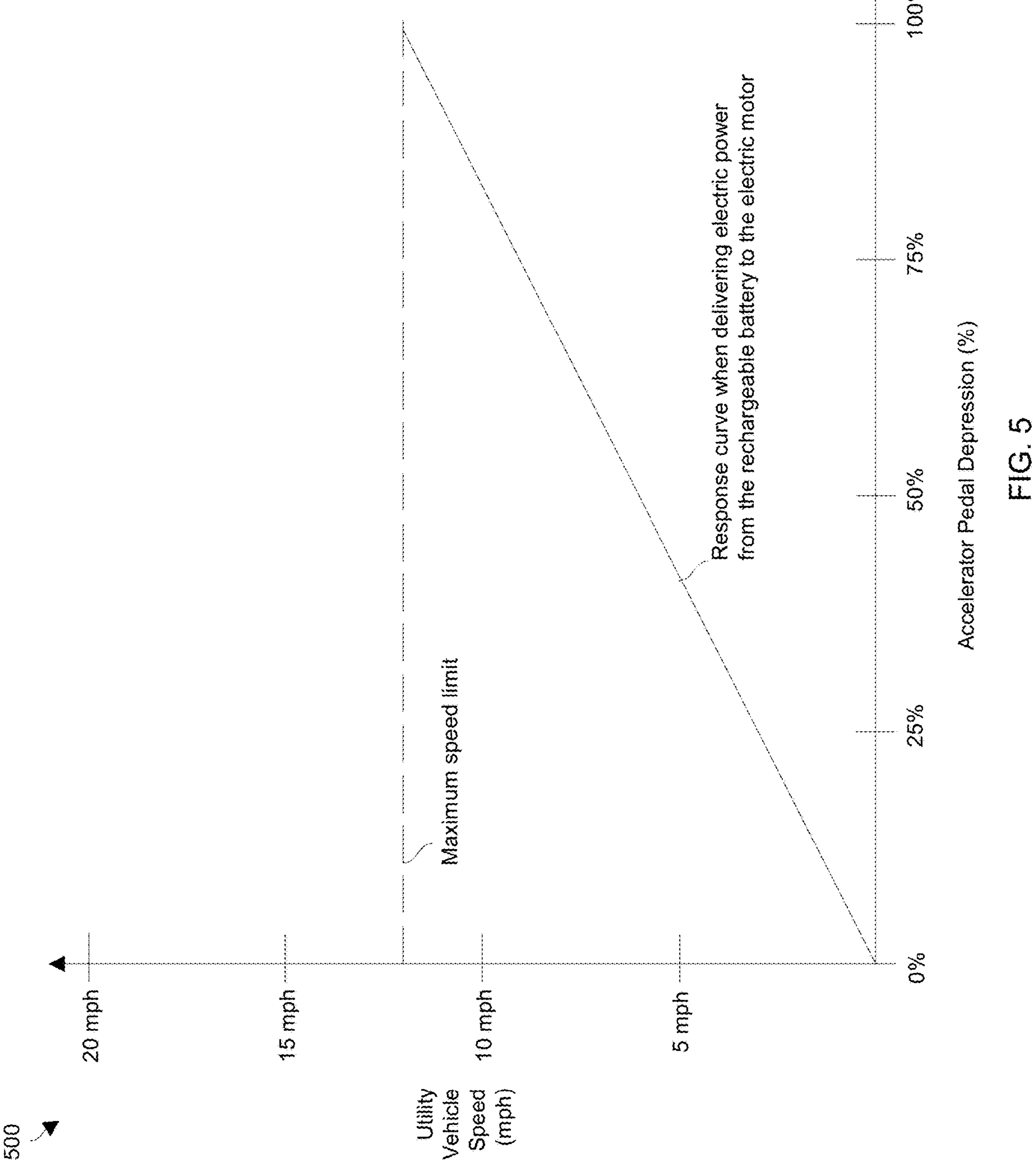
FIG. 5 is a chart of a second speed response function in accordance with certain embodiments.

FIGS. 4 and 5 show example vehicle speed limiting details based on state of charge in accordance with certain embodiments. FIG. 4 shows certain details of a first speed response function 400 for a utility vehicle 100 when the vehicle's rechargeable battery 250 is at a first state of charge. FIG. 5 shows certain details of a second speed response function 500 when the vehicle's rechargeable battery 250 is at a second state of charge that is different from the first state of charge.

As shown in FIG. 4, the motor controller 220 imposes a first speed response function 400 on the utility vehicle 100. The first speed response function 400 identifies particular utility vehicle speeds in response to percentage of accelerator pedal depression for the utility vehicle 100 when the rechargeable battery 250 is at a low state of charge (i.e., below a state of charge threshold). As mentioned earlier, the state of charge threshold may be established to avoid creating an overvoltage situation.

By way of example, the first speed response function 400 is linear and has, as an upper bound, a maximum speed limit of 20 mph. That is, when the operator fully depresses the accelerator pedal, the motor controller 220 moves the utility vehicle 100 at 20 mph. Additionally, when the operator depresses the accelerator pedal ¾ of the way, the motor controller 220 moves the utility vehicle at 15 mph. Furthermore, when the operator depresses the accelerator pedal halfway, the motor controller 220 moves the utility vehicle at 10 mph, and so on.

It should be understood that the first speed response function 400 may be appropriate for the utility vehicle 100 when the rechargeable battery 250 is currently at a low state of charge or when the rechargeable battery 250 is otherwise able to receive heavy electric charging without encountering an overvoltage situation. As mentioned earlier, the motor controller 220 may determine that the rechargeable battery 250 is currently at a low state of charge based on one or more battery metrics signals 330 from the BMS 132 (also see FIG. 3). Accordingly, the operator may even drive the utility vehicle 100 in the front-to back direction down a steep hill such that regenerative braking supplies heavy electric charging to the rechargeable battery 250. Since the rechargeable battery 250 is currently at a low state of charge, the rechargeable battery 250 is able to accept such heavy electric charging.

However, suppose that the motor controller 220 later determines that the rechargeable battery 250 is now at a high state of charge based on one or more battery metrics signals 330 from the BMS 132. Along these lines, the rechargeable battery 250 may have been recharged by a charger, by regenerative braking, combinations thereof, etc. At this point, the motor controller 220 adjusts the maximum speed limit of the utility vehicle 100 to prevent regenerative braking from providing heavy electric charging that could create an overvoltage situation.

By way of example, when the motor controller 220 determines that the rechargeable battery 250 is currently at a high state of charge, the motor controller 220 imposes the second speed response function 500 on the utility vehicle 100 in place of the first speed response function 400. That is, if the current state of charge of the rechargeable battery 250 is above a state of charge threshold, the motor controller 220 considers the rechargeable battery 250 to currently have a high state of charge. As mentioned earlier, the motor controller 220 may make such a determination from the battery metrics signals 330 from the BMS 132.

As shown in FIG. 5, the second speed response function 500 is linear and has, as an upper bound, a maximum speed limit of 12 mph. That is, when the operator fully depresses the accelerator pedal, the motor controller 220 moves the utility vehicle at 12 mph. Additionally, when the operator depresses the accelerator pedal ¾ of the way, the motor controller 220 moves the utility vehicle at 9 mph. Furthermore, when the operator depresses the accelerator pedal halfway, the motor controller 220 moves the utility vehicle at 6 mph, and so on.

When the motor controller 220 imposes the second speed response function 500, there is less charging from regenerative braking. Accordingly, the likelihood of overvoltage is greatly reduced.

Furthermore, should an overvoltage situation occur which causes disconnection of rechargeable battery 250, the utility vehicle 100 would be traveling at a speed which is at or below the lower speed threshold. Accordingly, if an emergency brake does automatically engage, the result would be less severe because the vehicle speed would be lower.

It should be understood that such lowering of the maximum speed limit of the utility vehicle 100 is not persistent/permanent. Rather, if the current state of charge of the rechargeable battery 250 drops below the state of charge threshold, the motor controller 220 considers the rechargeable battery 250 to have returned to a low state of charge. Once the rechargeable battery 250 is no longer at the high state of charge, motor controller 220 readjusts the maximum speed limit of the utility vehicle 100 back to the first speed response function 400.

Such maximum speed limit selection may be performed automatically in real-time in a manner that is transparent to the operator. Along these lines, there may be situations in which the motor controller 220 has adjusted the maximum speed limit, but the operator has not experienced any change in actual speed thus improving (or at least not degrading) the user experience.

It should be understood that the utility vehicle 100 may continue to operate in this manner in which the motor controller 220 adjusts the maximum speed limit of the utility vehicle 100 up, down, etc. based on the current state of charge of the rechargeable battery 250. During such operation, the rechargeable battery 250 is protected and the utility vehicle 100 performs useful work in a robust and reliable manner.

Moreover, it should be understood that although the motor controller 220 was described above as selecting among two speed response functions 400, 500 by way of example only. In other embodiments, the motor controller 220 selects among more than two speed response functions (e.g., three, four, etc.) based on the current state of charge of the rechargeable battery 250.

Furthermore, it should be understood that the speed response functions were described above as being linear by way of example only. In other embodiments, one or more of the speed response functions effectuated by the motor controller 220 has a different shape (e.g., a curved shape). Additionally, in some embodiments, the utility vehicle 100 is allowed to slowly coast (rather than stop the utility vehicle 100) when the operator is not depressing the accelerator pedal.

In accordance with certain embodiments, the motor controller 220 only lowers the maximum speed constraint when the rechargeable battery 250 has a high state of charge and the utility vehicle 100 is traveling front-to-back down an incline or downhill. The motor controller 22 may determine whether the utility vehicle 100 is traveling front-to-back down an incline by performing an incline assessment operation.

In some embodiments, the incline assessment operation involves the motor controller 220 monitoring various aspects of the electric motor 230 (e.g., the direction of motor rotation, motor current, etc.). For example, if the motor current indicates that regenerative braking is regenerating a significant amount of energy (e.g., as compared to a threshold), the motor controller 220 may conclude that the regenerated amount of energy is getting close to what the rechargeable battery 250 is able to accept and then lower the maximum speed constraint.

In other embodiments, the incline assessment operation involves use of one or more inertial measurement units (TIUs) (e.g., also see the other electrical components 280 in FIG. 2). Such an inertial measurement device may be able to sense along three axes and enable effective determination of current pitch, etc. of the utility vehicle 100. If IMU sensing indicates that the utility vehicle 100 is moving forward at a sufficient front-to-back downhill pitch, the motor controller 220 makes a positive determination that the utility vehicle 100 is traveling front-to-back down an incline.

In some arrangements, the utility vehicle 100 may access one or more IMUs for other operations. For example, the utility vehicle 100 may record (or log) IMU data over time to determine how the utility vehicle 100 has operated over a time period. Further details will now be provided with reference to FIG. 6.

Figure 6:
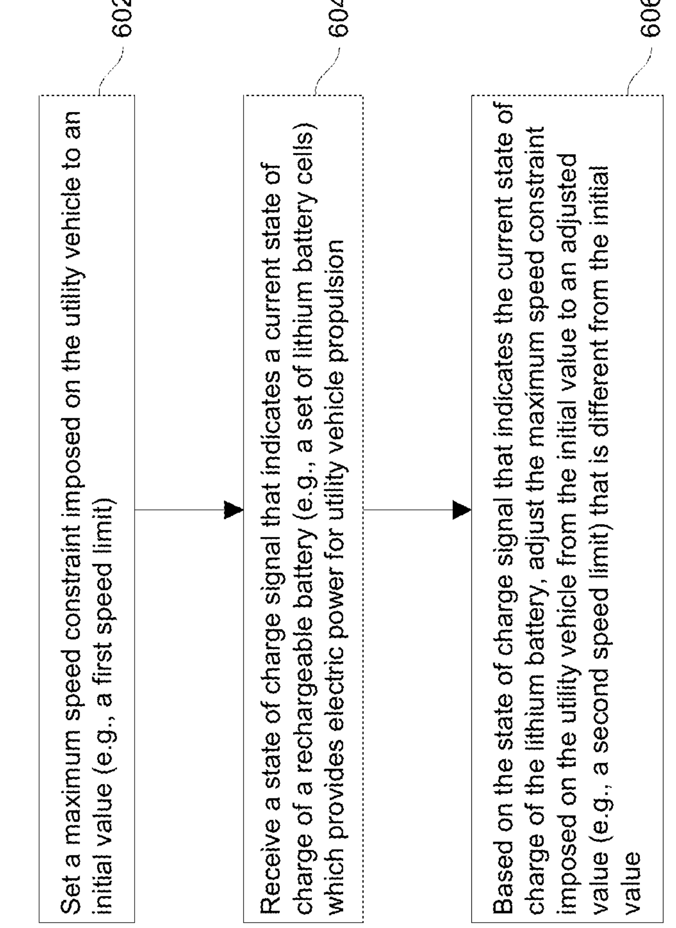
FIG. 6 is a flowchart of a procedure for speed limiting based on state of charge in accordance with certain embodiments.

FIG. 6 is a flowchart of a procedure 600 of controlling a utility vehicle (e.g., speed limiting) based on state of charge in accordance with certain embodiments. Such a procedure 600 may be performed by specialized circuitry of the utility vehicle such as by a motor controller, a BMS, other circuitry, combinations thereof, etc.

At 602, the specialized circuitry initially sets a maximum speed constraint imposed on the utility vehicle to an initial value. For example, the specialized circuitry may impose a first speed limit such as 20 mph on the utility vehicle.

At 604, the specialized circuitry receives a state of charge signal that indicates a current state of charge of a rechargeable battery which provides electric power for utility vehicle propulsion. A suitable rechargeable battery is one or more lithium battery cells.

At 606, the specialized circuitry, based on the state of charge signal that indicates the current state of charge of the lithium battery, adjusts the maximum speed constraint imposed on the utility vehicle from the initial value to an adjusted value that is different from the initial value. For example, the specialized circuitry may impose a second speed limit such as 12 mph on the utility vehicle. Such operation prevents regenerative braking from providing more charge than the rechargeable battery can accept and thus avoids creating an overvoltage situation.

As described above, improved techniques are directed to controlling a utility vehicle 100 via limiting speed based on state of charge. Along these lines, the utility vehicle 100 may use stored electrical energy from a rechargeable battery 250 for utility vehicle propulsion and may further perform regenerative braking to return electrical energy back to the rechargeable battery 250. If the rechargeable battery 250 is at a low state of charge, the utility vehicle 100 may operate under a first maximum speed constraint. However, the utility vehicle 100 may operate under a second maximum speed constraint that is different from the first maximum speed constraint when the rechargeable battery 250 is at a high state of charge. For example, the utility vehicle 100 may automatically lower its maximum permitted speed when the state of charge is sufficiently high. Such lowering of the maximum permitted speed prevents regenerative braking from creating an overvoltage situation. On the other hand, the maximum permitted speed of the utility vehicle 100 is not persistently reduced, but instead reduced only in certain situations such as to prevent the overvoltage situation, thus enabling the utility vehicle 100 to operate under a higher maximum permitted speed at other times.

While various embodiments of the present disclosure have been particularly shown and described, it will be understood by those skilled in the art that various changes in form and details may be made therein without departing from the spirit and scope of the present disclosure as defined by the appended claims.

One should appreciate that selective reduction of speed to reduce the occurrence of degraded regenerative speed control is not in use in golf, utility, or commercial applications. Rather, one approach to protecting a rechargeable battery may be to universally lower the top speed of a vehicle, which comes with the significant trade off of reducing the vehicle's utility even in situations where a lower top speed is not necessary to prevent degraded regenerative speed control. Another approach of reducing the occurrence of degraded regenerative speed control may be to use a burn-off resistor system to absorb energy in excess of what the battery pack can accept. This is expensive in componentry and assembly operations, and it is still possible to overheat such a system and resort to more intrusive methods of stopping the vehicle. An additional method of accomplishing this intent would be to operate an electronic braking mechanism such as an electric park or service brake to reduce the vehicle's speed, but this often comes with significant additional expense in componentry and assembly and also may be more objectionable to the operator, especially if a parking device is used to slow the vehicle, which is outside of its normal scope of operation.

In accordance with certain embodiments, improved techniques involve downhill speed limiting based on state of charge. Here, the maximum vehicle speed is selectively reduced in situations that will reduce the likelihood of energy regeneration causing degraded regenerative speed control.

It should be appreciated that electric vehicles typically feature vehicle speed control via motor speed control. Speed limitation typically involves regeneration of energy to the vehicle's battery pack. This causes battery voltage to rise, and if it rises sufficiently, regenerative speed control is often degraded in order to protect the battery from overvoltage.

Unfortunately, if battery voltage rises sufficiently due to regeneration of energy to limit the vehicle's speed, which most commonly occurs when travelling down a grade, regenerative speed control is degraded and the vehicle may not be able to limit its speed to its target speed.

However, certain improvements disclosed herein are able to selectively and temporarily reduce a vehicle's top speed in response to certain conditions and inputs thus preventing degradation of regenerative speed control. In fact, the vehicle can still operate to its normal top speed except when logic determines the necessity of reducing the speed to prevent negative consequences to regenerative speed control.

Degradation of regenerative speed control typically only happens in battery pack overvoltage situations, which typically only happen when the battery pack is at high state-of-charge (SOC). Reducing speed mitigates the consequences of this type of situation because the battery's voltage rise is proportional to the amount of power being regenerated, which is proportional to the vehicle's speed.

In accordance with certain embodiments, the vehicle's motor controller monitors battery SOC and voltage and reduces the vehicle top speed when the battery pack voltage and SOC are sufficiently high. Doing this selectively avoids the trade-off of persistently reducing the vehicle's utility by limiting the vehicle's top speed even in circumstances where it would not be necessary to prevent degradation of regenerative speed control.

In accordance with certain embodiments, such downhill speed limiting based on state of charge is further refined by using internal motor controller signals to infer when the vehicle is travelling down an incline and only reduce speed if the vehicle is travelling down a sufficiently steep incline. In some embodiments, circuitry monitors motor current and determines whether the motor is currently regenerating a significant amount of energy (as opposed to consuming energy to drive the vehicle up a grade or toward a higher speed). In other embodiments, circuitry uses an inertial measurement unit (IMU) or similar device (either internal or external to the motor controller) that reads or estimates the vehicle's pitch angle to make a direct determination of whether the vehicle is currently travelling down an incline. From there logic can be implemented to only reduce the speed if the vehicle is travelling down a sufficiently steep incline.

It should be appreciated that such improved techniques enable limiting utility vehicle speed based on state of charge. Such techniques allow the utility vehicle to efficiently and effectively perform useful work as well as safeguard the rechargeable battery. Accordingly, such techniques provide an improvement to electric vehicle technology such as improving operability of electric traction motors that access rechargeable batteries.

In some arrangements, certain values such as thresholds that determine whether the state of charge of the rechargeable battery 250 is high or low, the particular maximum speed limits for different states of charge, etc. may be determined via computations, algorithmically, etc. Suitable mechanisms include machine learning, reinforced learning, other forms of artificial intelligence, and so on.

Moreover, nothing precludes the improved techniques from being used in combination with other mechanisms. For example, in some embodiments, the utility vehicle 100 is still provisioned with a burn-off resistor, a mechanical service brake, combinations thereof, etc.

It should be further appreciated that any industry or product that utilizes regeneration from an electric motor or generator can apply the improvements disclosed herein. Such applications may be to other types of vehicles (e.g., aircraft, watercraft), hybrid vehicles, and so on. Such modifications and enhancements are intended to belong to various embodiments of the disclosure.

What is claimed is:

1. A method of controlling a utility vehicle, the method comprising:

initially setting a maximum speed constraint imposed on the utility vehicle to an initial value;

receiving a state of charge signal that indicates a current state of charge of a lithium battery which provides electric power for utility vehicle propulsion; and based on the state of charge signal that indicates the current state of charge of the lithium battery, adjusting the maximum speed constraint imposed on the utility vehicle from the initial value to an adjusted value that is different from the initial value;

wherein adjusting the maximum speed constraint imposed on the utility vehicle further includes:

performing an incline assessment operation that indicates whether the utility vehicle is currently traveling down an incline to prevent the maximum speed constraint imposed on the utility vehicle from being lowered from a first speed limit to a second speed limit unless the utility vehicle is currently traveling down an incline;

wherein the utility vehicle includes an electric motor that provides utility vehicle propulsion;

wherein performing the incline assessment operation includes:

providing an incline assessment operation result indicating that the utility vehicle is traveling front-to-back down the incline in response to the electric motor rotating in a predefined direction and regenerating an amount of energy that exceeds an energy regeneration threshold;

wherein the initial value is the first speed limit;

wherein the adjusted value is the second speed limit that is slower than the first speed limit;

wherein adjusting the maximum speed constraint imposed on the utility vehicle includes:

lowering the maximum speed constraint imposed on the utility vehicle from the first speed limit to the second speed limit; and wherein adjusting the maximum speed constraint imposed on the utility vehicle further includes:

performing a comparison operation that compares the current state of charge of the lithium battery indicated by the state of charge signal to a predefined state of charge threshold for the lithium battery, a result of the comparison operation indicating that the current state of charge of the lithium battery exceeds the predefined state of charge threshold for the lithium battery, the maximum speed constraint for the utility vehicle being lowered from the first speed limit to the second speed limit in response to the result of the comparison operation indicating that the current state of charge of the lithium battery exceeds the predefined state of charge threshold for the lithium battery.

2. The method of claim 1 wherein the utility vehicle includes a set of inertial measurement units (IMUs); and wherein providing the incline assessment operation result occurs in response to a set of output signals from the set of IMUs.

3. The method of claim 1 wherein the utility vehicle includes an accelerator pedal and a motor controller coupled with the accelerator pedal, the motor controller initially mapping angular deflection of the accelerator pedal to a first linear utility vehicle propulsion response from zero to the first speed limit; and wherein lowering the maximum speed constraint imposed on the utility vehicle from the first speed limit to the second speed limit includes:

remapping the angular deflection of the accelerator pedal to a second linear utility vehicle propulsion response from zero to the second speed limit in place of the first linear utility vehicle propulsion response.

4. The method of claim 1 wherein a current speed of the utility vehicle is lower than the first speed limit and higher than the second speed limit; and wherein the method further comprises:

slowing the utility vehicle from the current speed to at least a rate of the second speed limit in response to lowering the maximum speed constraint imposed on the utility vehicle from the first speed limit to the second speed limit.

5. The method of claim 1 wherein a current speed of the utility vehicle is lower than the first speed limit and the second speed limit; and wherein the method further comprises:

maintaining the current speed of the utility vehicle below the second speed limit.

6. The method of claim 1 wherein the utility vehicle includes a battery management system (BMS) coupled with the lithium battery, the state of charge signal that indicates the current state of charge of the lithium battery being received from the BMS; and wherein the method further comprises:

receiving a current voltage signal that indicates a current voltage of the lithium battery, the current voltage signal being different from the state of charge signal that indicates the current state of charge of the lithium battery.

7. Electronic circuitry to control a utility vehicle, the electronic circuitry comprising:

a battery system interface; and a controller coupled with the battery system interface, the controller being constructed and arranged to perform a method of:

initially setting a maximum speed constraint imposed on the utility vehicle to an initial value, receiving, through the battery system interface, a state of charge signal that indicates a current state of charge of a lithium battery which provides electric power for utility vehicle propulsion, and based on the state of charge signal that indicates the current state of charge of the lithium battery, adjusting the maximum speed constraint imposed on the utility vehicle from the initial value to an adjusted value that is different from the initial value;

wherein adjusting the maximum speed constraint imposed on the utility vehicle further includes:

performing an incline assessment operation that indicates whether the utility vehicle is currently traveling down an incline to prevent the maximum speed constraint imposed on the utility vehicle from being lowered from a first speed limit to a second speed limit unless the utility vehicle is currently traveling down an incline;

wherein the utility vehicle includes an electric motor constructed and arranged to provide utility vehicle propulsion;

wherein performing the incline assessment operation includes:

providing an incline assessment operation result indicating that the utility vehicle is traveling front-to-back down the incline in response to the electric motor rotating in a predefined direction and regenerating an amount of energy that exceeds an energy regeneration threshold;

wherein the initial value is the first speed limit;

wherein the adjusted value is the second speed limit that is slower than the first speed limit;

wherein adjusting the maximum speed constraint imposed on the utility vehicle includes:

lowering the maximum speed constraint imposed on the utility vehicle from the first speed limit to the second speed limit; and wherein adjusting the maximum speed constraint imposed on the utility vehicle further includes:

performing a comparison operation that compares the current state of charge of the lithium battery indicated by the state of charge signal to a predefined state of charge threshold for the lithium battery, a result of the comparison operation indicating that the current state of charge of the lithium battery exceeds the predefined state of charge threshold for the lithium battery, the maximum speed constraint for the utility vehicle being lowered from the first speed limit to the second speed limit in response to the result of the comparison operation indicating that the current state of charge of the lithium battery exceeds the predefined state of charge threshold for the lithium battery.

8. The electronic circuitry as in claim 7 wherein the battery system interface is constructed and arranged to receive the state of charge signal that indicates the current state of charge of the lithium battery from a battery management system (BMS) coupled with the lithium battery; and wherein the method further comprises:

receiving, through the battery system interface, a current voltage signal that indicates a current voltage of the lithium battery, the current voltage signal being different from the state of charge signal that indicates the current state of charge of the lithium battery.

9. The electronic circuitry as in claim 7 wherein a current speed of the utility vehicle is lower than the first speed limit and higher than the second speed limit; and wherein the method further comprises:

slowing the utility vehicle from the current speed to at least a rate of the second speed limit in response to lowering the maximum speed constraint imposed on the utility vehicle from the first speed limit to the second speed limit.

10. The electronic circuitry as in claim 7 wherein a current speed of the utility vehicle is lower than the first speed limit and the second speed limit; and wherein the method further comprises:

maintaining the current speed of the utility vehicle below the second speed limit.

11. A utility vehicle, comprising:

a battery management system (BMS) having a lithium battery;

a utility vehicle propulsion system constructed and arranged to provide utility vehicle propulsion using electric power from the lithium battery; and electronic circuitry coupled with the BMS and the utility vehicle propulsion system, the electronic circuitry being constructed and arranged to perform a method of:

initially setting a maximum speed constraint imposed on the utility vehicle to an initial value, receiving, from the BMS, a state of charge signal that indicates a current state of charge of the lithium battery which provides electric power for utility vehicle propulsion, and based on the state of charge signal that indicates the current state of charge of the lithium battery, adjusting the maximum speed constraint imposed on the utility vehicle from the initial value to an adjusted value that is different from the initial value;

wherein adjusting the maximum speed constraint imposed on the utility vehicle further includes:

performing an incline assessment operation that indicates whether the utility vehicle is currently traveling down an incline to prevent the maximum speed constraint imposed on the utility vehicle from being lowered from a first speed limit to a second speed limit unless the utility vehicle is currently traveling down an incline;

wherein the utility vehicle propulsion system includes an electric motor constructed and arranged to provide the utility vehicle propulsion; and wherein performing the incline assessment operation includes:

providing an incline assessment operation result indicating that the utility vehicle is traveling front-to-back down the incline in response to the electric motor rotating in a predefined direction and regenerating an amount of energy that exceeds an energy regeneration threshold;

wherein the initial value is the first speed limit;

wherein the adjusted value is the second speed limit that is slower than the first speed limit;

wherein adjusting the maximum speed constraint imposed on the utility vehicle includes:

lowering the maximum speed constraint imposed on the utility vehicle from the first speed limit to the second speed limit; and wherein adjusting the maximum speed constraint imposed on the utility vehicle further includes:

performing a comparison operation that compares the current state of charge of the lithium battery indicated by the state of charge signal to a predefined state of charge threshold for the lithium battery, a result of the comparison operation indicating that the current state of charge of the lithium battery exceeds the predefined state of charge threshold for the lithium battery, the maximum speed constraint for the utility vehicle being lowered from the first speed limit to the second speed limit in response to the result of the comparison operation indicating that the current state of charge of the lithium battery exceeds the predefined state of charge threshold for the lithium battery.

12. The utility vehicle of claim 11, further comprising:

a set of ground engagement members;

wherein the electric motor is further constructed and arranged to operate the set of ground engagement members, and a motor controller coupled with the electronic circuitry, the motor controller being constructed and arranged to control the electric motor;

wherein the motor controller includes a set of inertial measurement units (IMUs); and wherein the incline assessment operation result is based on input from the set of IMUs.

13. The method of claim 1, wherein adjusting the maximum speed constraint imposed on the utility vehicle includes:

decreasing the maximum speed constraint based on the state of charge signal indicating that the current state of charge has reached a predefined state of charge threshold, the current state of charge being a percentage of a full charge of the lithium battery.

14. The method of claim 1 wherein adjusting the maximum speed constraint further includes:

lowering the maximum speed constraint in response to detecting that the state of charge signal exceeds a predefined state of charge threshold and the incline assessment operation result indicating that the utility vehicle is traveling front-to-back down the incline.

* * * * *